United States Patent [19]

Lewiner et al.

[11] Patent Number: 4,672,376

[45] Date of Patent: Jun. 9, 1987

[54] PORTABLE CONTROL CODE TRANSMITTER WITH DELAYED CODE NEUTRALIZATION

[76] Inventors: Jacques Lewiner, 5, rue Bory d'Arnex, 92210 Saint-Cloud; Claude Hennion, 18, rue Flatters, 75005 Paris, both of France

[21] Appl. No.: 833,523

[22] Filed: Feb. 24, 1986

Related U.S. Application Data

[63] Continuation of Ser. No. 677,485, Dec. 3, 1984, abandoned.

[30] Foreign Application Priority Data

Dec. 2, 1983 [FR] France ............................... 83 19352

[51] Int. Cl.[4] ............................................... H04Q 1/00

[52] U.S. Cl. .......................... 340/825.31; 340/825.34; 340/825.69; 340/825.72; 361/172

[58] Field of Search ............................... 361/171, 172; 340/825.31, 825.34, 825.69, 825.7, 825.74, 542, 543, 539, 825.72; 307/10 AT; 70/338, 277, 278, 285, 267, 269, 271, 382, 383, 434, 432, 433, DIG. 51, DIG. 44, DIG. 71; 235/435-454

[56] References Cited

U.S. PATENT DOCUMENTS

| | | | |
|---|---|---|---|
| 3,891,980 | 6/1975 | Lewis et al. | 340/825.31 X |
| 3,906,447 | 9/1975 | Crafton | 340/825.31 X |
| 3,959,630 | 5/1976 | Hogberg | 340/825.34 X |
| 4,473,821 | 9/1984 | Yang et al. | 340/539 |
| 4,573,046 | 2/1986 | Pinnow | 361/172 X |

*Primary Examiner*—Ulysses Weldon

*Attorney, Agent, or Firm*—Larson and Taylor

[57] ABSTRACT

A portable case (2) is provided for emitting, in response to pressure on a push button (1), a control signal (S) coded in accordance with a code recorded in said case. Timing means (8) are provided for automatically neutralizing the code when a predetermined time has elapsed from a predetermined moment, which then makes the case inoperative.

10 Claims, 1 Drawing Figure

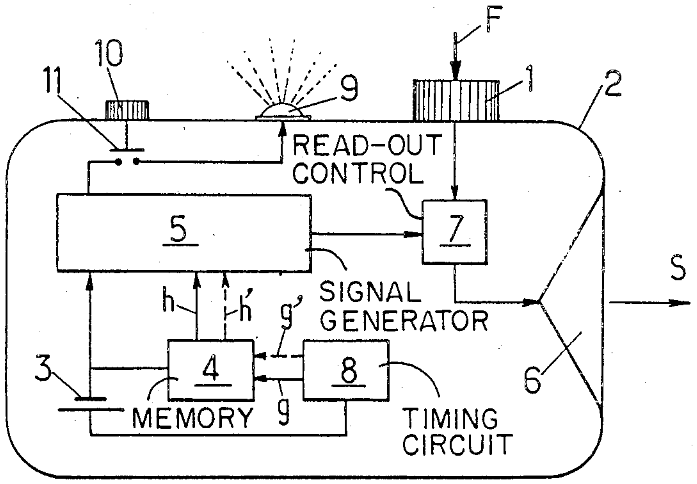
F
10
11
9
1
2
READ-OUT
CONTROL
5
7
S
SIGNAL
GENERATOR
h
h'
g'
3
4
8
6
MEMORY
g
TIMING
CIRCUIT

PORTABLE CONTROL CODE TRANSMITTER WITH DELAYED CODE NEUTRALIZATION

This application is a continuation of application Ser. No. 677,485 filed 12/3/84, now abandoned.

The invention relates to devices used for control purposes, preferably for opening doors, by means of coded signals.

It relates more particularly, among these devices, to those which comprise on the one hand a portable case or unit adapted for emitting coded signals corresponding to a code previously recorded in this case and on the other hand a receiver mounted on the member to be controlled and adapted so as to receive said coded signals, to compare them with a previously recorded reference and to provide the desired control when this comparison reveals identity between the coded signal received and the reference.

It relates more particularly to the emitter cases of these control devices.

In some circumstances, the person responsible for premises or a given apparatus, access to which is controlled by a lock which is itself controllable by means of a coded device of the above kind, may wish to authorize a third person to have acces thereto for a limited time, this time depending on the application envisaged and being variable within wide limits, for example a quarter of an hour for using a predetermined apparatus or a day for the availability of a hotel room.

With the present embodiments of the emitter cases of the kind in question, the case assigned to the control of the lock is entrusted to each temporarily authorized user at the beginning of the authorization period and this case must be handed back by said user to the responsible person at the end of this time.

The disadvantage of this systen resides in the fact that the lock considered may be actuated by the bearer of said case beyond the authorized time if he does not give up this case at the end of this time.

This disadvantage may be serious in some cases.

The aim of the invention is more especially to overcome this disadvantage.

For this, each emitter case of the kind in question is essentially characterized according to the invention in that it comprises timing means adapted to neutralize the code which is recorded therein automatically and permanently at the end of a given time $T_1$ which has elapsed from a predetermined time $t_1$, particularly the time when this code was recorded.

In preferred embodiments, recourse is further had to one and/or other of the following arrangements:

(a) in addition to the above code, "of order 1", at least another code of order i (i being a whole number at least equal to 2), corresponding to a distinct control, is recorded in the case and each of these other codes is associated with timing means adapted to neutralize it after a time Ti different from $T_1$ which has elapsed from a predetermined time $t_i$, which time is preferably the same as time $t_1$, (b) in a control device according to the preceding paragraph, the means for elaborating coded control signals are such that each of the signals elaborated by these means at a given time is the bearer of different codes valid at this time and is capable of ensuring all the controls individually subjected to these different codes and only these controls, (c) the case comprises display means for indicating at any desired moment the state neutralized or not of each recorded code, (d) the case according to the preceding paragraph comprises means associated with each recorded code for indicating at least approximately at any desired moment the remaining time separating this moment from the future moment when said code is neutralized.

The invention comprises, apart from these main arrangements, certain other arrangements which are preferably used at the same time and which will be more explicitly discussed hereafter.

In what follows, preferred embodiments of the invention will be described, with reference to the accompanying drawings in a way which is of course in no wise limitative.

The single FIGURE of these drawings shows schematically a code control device constructed in accordance with the invention.

Desiring to provide, by simple pressure on a push button 1 forming part of a portable pocket case 2, any coded electric controls such for example as the unlocking of the lock of a door (not shown) followed possibly by automatic opening of this door, said case comprises the following elements:

(a) an electric power source 3, (b) a memory 4 for recording a code C corresponding to the coded control signals to be emitted S, (c) an electronic circuit 5 connected to said memory 4 and adapted to elaborate or generate said signals S, which are generally in the form of coded successions of electric pulses, (d) a transmitter means 6 adapted to emit or transmit externally of the case 2 the signals S thus elaborated, the emission in question being preferably provided by electromagnetic or ultrasonic waves, (e) and an electronic device 7 arranged so that whenever the pushbutton 1 is pressed, shown schematically by the arrow F, it causes the code recorded in memory 4 to be read out, the coded corresponding signal S to be transmitted to the emitter 6 and so this signal S to be emitted.

The power source 3 may be a battery or one of the components of a transformer the other component of which would be a loop surrounding the position where case 2 must be situated for emitting the signals S.

As far as it is concerned, the lock to be controlled is associated with a receiver comprising means for receiving the signals S and transforming them into electronically usable signals, a memory in which a reference code R has been recorded, means for comparing with the code R the code C borne by each signal S received and means for emitting an electric control signal E whenever there is identity between the two codes C and R, and said lock is itself adapted so as to be able to be actuated by said control signal E.

With such an assembly, when the correct code C, i.e. corresponding to the code R recorded in the receiver, has been recorded in memory 4 of case 2, it is sufficient to press button 1 to cause the coded signal S to be emitted and so to unlock the lock if the case is situated sufficiently close thereto and adequately orientated.

Such a coded control remains possible as long as the electronic signal generator circuit 5 is able to elaborate coded signals S and as long as the lock to be unlocked is able to receive these signals, identify them and use them.

The essential purpose of the invention consists in putting an end automatically to this control possibility at the end of a period of authorization or validation of predetermined length. $T_1$ so as to make the coded controls in question impossible by the bearer of the case 2 considered beyond said period.

For this, timing means are incorporated in case 2 for automatically neutralizing the code C in question at the end of the period considered, which begins at a predetermined time $t_1$.

This time $t_1$ is preferably that when said code was recorded in memory 4, which time generally coincides with that at which the case is entrusted to the authorized user.

But the time $t_1$ in question at which the period of validity of case 2 begins could also be subsequent by another predetermined time $T'_1$ to the moment of recording the code in the memory.

The timing means or timing circuit in question have been shown schematically in the drawings by block 8 fed from source 3 and adapted for driving (arrow g) memory 4 for neutralizing this memory.

This neutralization is provided more particularly by clearing the code C recorded in the memory, or by breaking the connection (arrow h) over which this memory instructs the elaboration or generator circuit 5.

Thus, on expiry of time $T_1$, case 2 can no longer emit coded signals S and its bearer can no longer unlock the lock subjected to these signals.

Said case has therefore become inoperative.

When this case is again handed back to the person responsible for supervising the lock, the appropriate code C may be again recorded at any desirable moment in memory 4 of this case, which makes it again capable of unlocking said lock during the above period $T_1$ starting from a new time $t_1$.

Numerous improvements may be made to the above case and in particular the following.

First of all, it may be useful for the user of case 2 to know at any time if it is still valid or, better still, how much time separates said time from the end of the period of validity.

The first information may be very simply obtained by displaying on the case a validity signal of the on off type, such as the lighting of an indicator lamp 9 or the appearance of a contrasting sign on a neutral background, formed from liquid crystals.

To economize the energy of source 8, this display may be provided solely in response to a pressure on a verification push button 10 associated with an appropriate switch 11.

The second information may be given by displaying on the case an evolutive validity signal, i.e. able to evolve from the beginning to the end of the period of validity, preferably progressively so as to provide a indication of the time remaining in the period. Such a "time remaining" display is indicated at 12.

Such an evolutive signal may be formed for example by a succession of contrasting dots generated by liquid crystals on a neutral background, which dots are cleared successively in time, or else by a digital display.

According to another improvement for assigning different validation times to case 2 depending on different locks to be controlled in number n (n being a whole number greater than 1 and more especially equal to 2), the number of codes recorded in memory 4 of case 2 and adapted to instruct the electronic circuit 5 is equal to n, these codes $C_i$ (i being a whole number between 1 and n) are recorded simultaneously in memory 4, their respective validity periods $T_i$ are different and begin at times $t_i$ which may themselves be different but are preferably the same.

In the drawings, arrow g' symbolizes the neutralization of the different codes $C_i$ of order i greater than 1 at the end of the different delays $T_i$ determined by circuit 8 and arrow h' symbolizes the instruction given to the elaboration circuit 5 by these different codes, recorded in memory 4.

Such multiple recording of codes may be used in several ways.

Thus, recourse may be had respectively to n parallel channels for elaborating distinct coded signals $S_i$ of order i coded respectively in codes $C_i$, which channels may be used simultaneously by pressing the button 1, each signal $S_i$ of order i being adapted for controlling the locks subjected selectively to the code $C_i$ of the same order as this signal.

Thus, if at a given moment the number of valid codes is equal to j (j being a whole number between 1 and n), each pressure on button 1 causes the emission of a beam of j signals $S_i$ and the lock receiving all these signals is effectively unlocked if, and only if the code which is associated therewith forms part of the j codes valid at the time considered.

According to another formula, the multiple recording in question causes the emission, for each pressure on button 1, of single signals coded j times, j varying from 0 to n depending on the time of said pressure, which signals are each adapted for unlocking locks of different types, each lock of type i being responsive to those of said signals which are coded $n+1-i$ times or more.

Thus, if the period $T_i$ increases when the index i increases from 1 to n, (a) the locks of order 1 are only unlockable by the maximum coded signals, i.e. n times and they cease to be unlockable at the end of the shortest period $T_1$, (b) the locks of order 2 are unlockable by the signals coded n or $n-1$ times and cease to be unlockable at the end of the period $T_2$, (c) and so on, the locks of order n being unlockable for the longest time, namely by all the preceding signals and being the only one to be still unlockable by those coded by the last code of order n alone.

Case 2 may be arranged so that each time push button 1 is pressed; a single coded signal S is emitted.

It may also be adapted so that this emission is renewed systematically, for example once per second, as long as the push button remains pressed in.

The different data relative to the codes, to the period of validity of these codes and possibly to the times when these validities take effect, if these times differ from the times when the cases are handed over to authorized bearers, may be permanently recorded in these cases and in this case the person responsible for said cases need only reactivate these data whenever the cases are given to different bearers.

In a variant, the data in question are not permanently recorded in these cases but are introduced therein by the person responsible using a programmer indicated at 13.

Said data may themselves have been previously recorded, at least partly in said programmer 13, or else they may be set directly on this programmer, using a keyboard or in any other desirable way.

In the case of previous recording in the programmer, it may be appropriate to protect this latter against unauthorized use.

For this, the programmer 13 is adapted so that each time it is used a secret code must be previously formed or else a special coded key used in any desirable way.

User proof means may be provided for modifying the beginning and/or the end of each period of validation recorded in the case.

This case may also be adapted so that it lends itself to reading the different information recorded therein by means of a reading device specially provided for this purpose and available only to the person responsible for the cases. Such a reading device or reader is indicated at 14.

This reading allows said person to check on the respective capacities of the different cases, either individually when each case is presented, or as a whole when all the distributed cases have been gathered together.

To complete the information for the person responsible, a special mark may be assigned to each code for identifying the bearer of the case receiving this code.

Each case may also be adapted so as to assign to each coded signal emitted thereby a special mark for identifying this csse, which mark may be used for recording and/or display purposes by the locks which in this case are specially adapted and/or by the above mentioned reading apparatus.

Each case may be adapted so that each code recorded in its memory may be readily neutralized by voluntary external action, even before expiry of the corresponding validation period. This external action may be the fact of pressing a push button, such as that indicated at 15, provided for this purpose or else removal of a part for interrupting an electrical connection.

Following which, whatever the embodiment adopted, a coded control device is finally obtained whose construction, operation and advantages follow sufficiently from the foreoging.

As is evident, and as it follows moreover already from what has gone before, the invention is in no wise limited to those of its modes of application and embodiments which have been more especially considered; it embraces, on the contrary, all variations thereof.

What is claimed is:

1. A portable case comprising signal generator means for generating and wirelessly transmitting, externally of the case to a remote receiver, using electromagnetic waves, control signals S coded in accordance with a code previously recorded in the case in a memory which is connected to said signal generator means and forms a permanent part of the case, said signal generator means being capable of providing multiple transmissions of said coded signals and the case comprising a portable pocket-sized unit, said case further including timing means, connected to said memory, for neutralizing the code recorded in said memory automatically and permanently, irrespective of whether said signal generator has transmitted a said control signal, at the end of a given time period $T_1$ measured beginning at a predetermined reference point in time $t_1$.

2. The case according to claim 1, wherein the moment $t_1$ is that when the code was recorded in the case.

3. The case according to claim 1, wherein, in addition to the above first mentioned code which is "of order 1", at least one other code of order i wherein i is a whole number at least equal to 2, corresponding to a distinct control, is recorded in the case in said memory and in that said at least one other code is associated with timing means for neutralizing that code after a time period $T_i$ measured from the time $t_1$ and different from the time period $T_1$ which has elapsed.

4. The case according to claim 3, wherein the means for generating the coded control signals is such that each of these signals generated by this means at a given moment is the bearer of the different codes valid at this moment and is able to ensure all the controls subjected individually to these different codes and only these controls.

5. The case according to claim 1, wherein the case further comprises display means for indicating at any desired moment the state neutralized or not of each recorded code.

6. A portable case comprising signal generator means for generating and wirelessly transmitting, externally of the case to a remote receiver, using ultrasonic waves, control signals S coded in accordance with a code previously recorded in the case in a memory which is connected to said signal generator means and forms a permanent part of the case, said signal generator means being capable of providing multiple transmissions of said coded signals and the case comprising a portable pocket-sized unit, said case further including timing means, connected to said memory, for neutralizing the code recorded in said memory automatically and permanently, irrespective of whether said signal generator has transmitted a said control signal, at the end of a given time period $T_1$ measured beginning at a predetermined reference point in time $T_1$.

7. The case according to claim 6 wherein the moment $t_1$ is that at which the code was recorded in the case.

8. The case according to claim 6 wherein, in addition to the above first mentioned code which is of order 1, at least one other code of order i, where i is a whole number at least equal to 2, corresponding to a distinct control, is recorded in the case in said memory and wherein said at least one other code is associated with timing means for neutralizing that code after a time period $T_i$ measured from the time $t_1$ and different from the time period $T_1$ which has elapsed.

9. The case according to claim 6, wherein the means for generating the coded control signals are such that each of these signals generated by these means at a given moment is the bearer of the different codes valid at this moment and is able to ensure all the controls subjected individually to these different codes and only these controls.

10. The case according to claim 6 wherein the case further comprises display means for indicating at any desired moment the state neutralized or not of each recorded code.

* * * * *